(12) United States Patent
Kato et al.

(10) Patent No.: US 7,813,757 B2
(45) Date of Patent: Oct. 12, 2010

(54) INFORMATION PROCESSOR, INFORMATION PROCESSING METHOD, PROGRAM AND RECORDING MEDIUM

(75) Inventors: Wataru Kato, Tokyo (JP); Takashi Fukushima, Tokyo (JP); Kissei Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1330 days.

(21) Appl. No.: 11/312,897

(22) Filed: Dec. 20, 2005

(65) Prior Publication Data

US 2006/0132844 A1 Jun. 22, 2006

(30) Foreign Application Priority Data

Dec. 21, 2004 (JP) .............................. 2004-368672

(51) Int. Cl.
*H04M 1/00* (2006.01)
*H04B 1/38* (2006.01)

(52) U.S. Cl. .................. 455/550.1; 455/574; 455/575.1

(58) Field of Classification Search ................. 455/403, 455/572, 575.1, 574, 566; 370/350; 705/50; 358/1.15
See application file for complete search history.

(56) References Cited

U.S. PATENT DOCUMENTS

2004/0087351 A1 * 5/2004 Paver et al. .................. 455/574

FOREIGN PATENT DOCUMENTS

| JP | 2001-313695 A | 11/2001 |
|---|---|---|
| JP | 2001-320312 A | 11/2001 |
| JP | 2002-050998 A | 2/2002 |
| JP | 2003-316481 A | 11/2003 |
| JP | 2004-048466 A | 2/2004 |

\* cited by examiner

*Primary Examiner*—Charles N Appiah
*Assistant Examiner*—Kiet Doan
(74) *Attorney, Agent, or Firm*—Wolf, Greenfield & Sacks, P.C.

(57) ABSTRACT

Disclosed herein is an information processor including, a first function portion including communication means for executing processing relating to communication of data, and communication managing means for controlling the communication means and for managing information representing whether or not the communication means is executing the processing relating to the communication of the data, a second function portion different from the first function portion, instructing means for issuing an instruction to stop the first function portion, determining means provided in the second function portion for, when the instructing means issues the instruction to stop the first function portion, determining based on the information managed by the communication managing means whether or not the communication means is executing the communication processing, and stopping means provided in the second function portion for, when the determing means determines that the communication means is executing the communication processing, stopping the first function portion after the communication processing is completed.

8 Claims, 13 Drawing Sheets

INFORMATION PROCESSOR, INFORMATION PROCESSING METHOD, PROGRAM AND RECORDING MEDIUM

CROSS REFERENCES TO RELATED APPLICATIONS

The present invention contains subject matter related to Japanese Patent Application JP 2004-368672 filed in the Japanese Patent Office on Dec. 21, 2004, the entire contents of which being incorporated herein by reference.

BACKGROUND OF THE INVENTION

The present invention relates to an information processor, an information processing method, a program, and a recording medium, and more particularly to an information processor, an information processing method, a program, and a recording medium which are capable of allowing a more comfortable communication environment to be provided for more users.

In recent years, a large number of music delivery services each utilizing a mobile phone have been presented. Also, the number of users each listening to a received musical piece utilizing his/her own mobile phone having an audio function installed therein has been increased. On the other hand, mobile terminal equipment which has a communication function such as a mobile phone installed in a portable terminal narrowed down to an audio function (the so-called "WALK-MAN" (Registered Trademark of Sony Corporation)) and thus can make communication, or receives a music delivery service has been proposed, for example, in Japanese Patent Laid-Open No. 2001-111724.

The portable terminal which has developed in such a manner has a convenient function (e.g., a function able to reproduce data of audio contents and to receive or transmit an e-mail) which cannot be realized in a audio player in related art. On the other hand, such a portable terminal involves a problem that has been left out of consideration in any of the audio players in related art. For example, a situation occurs such that a user desires to disable a call function (communication function) to limit the functions to only an audio reproducing function when an incoming call arrives from other mobile phone at his/her own portable terminal while he/she listens to a musical piece, or when he/she is on an airplane, a train, a hospital, etc.

For this reason, of the mobile phones, some models have been developed each of which has a mode called a personal mode provided therein in order to enable only the communication function to be disabled.

SUMMARY OF THE INVENTION

However, since the portable terminal in related art has been developed on the mobile phone basis, in order to set a mode of the portable terminal to the personal mode, it is necessary to make the setting while an operation menu of the mobile phone is selected. Thus, for the user who listens to and enjoy the musical piece while having a feeling about the audio player in related art, a problem is encountered such that the operation is complicated and thus hardly used as compared with the operation for activation, stop or the like of the audio player (e.g., reproduction of the musical piece). In addition, while the user is on an airplane or the like, he/she is generally instructed not to set the mode of his/her own mobile phone to the personal mode, but to turn OFF a power source of his/her own mobile phone (since if for example, the power source is held turned ON, the crew cannot distinguish whether or not the personal mode is really set). Hence, when the user desires to disable the communication function, he/she takes such coping with such a situation as to turn OFF the power source of the mobile phone itself.

Moreover, when the power source of the mobile phone is turned OFF during the communication processing (e.g., during the download of the musical piece data, the reception of the e-mail, etc.) to interrupt the communication processing, the same processing needs to be repeated again later. Thus, many users leave the power sources of their mobile phones not turned OFF even when they are in the vicinity of priority seats in a train, a hospital or the like. As a result, there is encountered such a problem that it is impossible to provide the comfortable function for the user, and provide the comfortable environment for those as well around the user.

The present invention has been made in the light of such circumstances, and it is, therefore, an object of the present invention to allow a more comfortable communication environment to be provided for more users.

In order to attain the above-mentioned object, according to an embodiment of the present invention, there is provided an information processor including: a first function portion including communication means for executing processing relating to communication of data, and communication managing means for controlling the communication means and for managing information representing whether or not the communication means is executing the processing relating to the communication of the data, a second function portion different from the first function portion, instructing means for issuing an instruction to stop the first function portion, determining means provided in the second function portion for, when the instructing means issues the instruction to stop the first function portion, determining based on the information managed by the communication managing means whether or not the communication means is executing the communication processing, and stopping means provided in the second function portion for, when the determining means determines that the communication means is executing the communication processing, stopping the first function portion after the communication processing is completed.

According to another embodiment of the present invention, there is provided an information processing method for use in an information processor including a first function portion having a communication step of executing processing relating to communication of data, and a communication managing step of controlling the communication step and of managing information representing whether or not the processing relating to the communication of the data is being executed in the communication step, and a second function portion having a function different from that of the first function portion, the method including the steps of: receiving an instruction to stop the first function portion; determining based on the information managed in the processing of the communication managing step whether or not the communication processing is being executed in the processing of the communication step, when the instruction to stop the first function portion is received in the processing of an instruction receiving step, a determing step being executed in the second function portion, as one function of a plurality of function portions, different from the first function portion; and stopping the first function portion after the communication processing is completed, when it is determined in the processing of the determing step that the communication processing is being executed in the processing of the communication step.

According to yet another embodiment of the present invention, there is provided a computer readable program for making an information processor execute information processing, the information processor including a first function portion having a communication step of executing processing relating to communication of data, and a communication management step of controlling the communication step and of managing information representing whether or not the processing relating to the communication of the data is being executed in the communication step, and a second function portion having a function different from that of the first function portion, the program including the steps of: receiving an instruction to stop the first function portion; determining based on the information managed in the processing of the communication management controlling step whether or not the communication processing is being executed in the processing of the communication controlling step, when the instruction to stop the first function portion is received in the processing of an instruction reception controlling step, the determing controlling step being executed in the second function portion, as one function of a plurality of function portions, different from the first function portion; and stopping the first function portion based on the determined results obtained from the processing of the determing controlling step executed in the second function portion.

According to yet another embodiment of the present invention, there is provided a recording medium having a computer readable program recorded, the program serving to make an information processor execute information processing, the information processor including a first function portion having a communication step of executing processing relating to communication of data, and a communication management step of controlling the communication step and of managing information representing whether or not the processing relating to the communication of the data is being executed in the communication step, and a second function portion having a function different from that of the first function portion, the program including the steps of: receiving an instruction to stop the first function portion; determining based on the information managed in the processing of the communication management controlling step whether or not the communication processing is being executed in the processing of the communication controlling step, when the instruction to stop the first function portion is received in the processing of an instruction reception controlling step, the determing controlling step being executed in the second function portion, as one function of a plurality of function portions, different from the first function portion; and stopping the first function portion based on the determined results obtained from the processing of the determing controlling step executed in the second function portion.

According to yet another embodiment of the present invention, there is provided an information processor including: a communication function portion for executing processing relating to communication of data; a reproduction function portion for executing processing relating to reproduction of data of content containing data of content downloaded through communication with other information processor made by the communication function portion; first instructing means for issuing an instruction to activate or stop a predetermined function; second instructing means for issuing an instruction to activate the communication function portion; and power supplying means for, when the first instructing means issues the instruction to execute the predetermined function, supplying a power to the reproduction function portion, for, when the second instructing means issues the instruction to activate the communication function portion, supplying a power to the communication function portion, and for, when the first instructing means issues the instruction to stop the predetermined function, stopping the supply of the power to the reproduction function portion and the communication function portion.

According to yet another embodiment of the present invention, there is provided an information processing method for use in an information processor including a communication function portion for executing processing relating to communication of data; a reproduction function portion for executing processing relating to reproduction of data of content containing data of content downloaded through communication with other information processor made by the communication function portion; power supplying means for supplying a power required to drive the information processor; first instructing means for issuing an instruction to activate or stop a predetermined function; and second instructing means for issuing an instruction to activate the communication function portion.

In this information processor, when the first instructing means issues the instruction to activate the predetermined function, the power supplying means supplies the power to the reproduction function portion, when the second instructing means issues the instruction to activate the communication function portion, the power supplying means further supplies the power to the communication function portion, and when the first instructing means issues the instruction to stop the predetermined function, the power supplying means stops the supply of the power to the reproduction function portion and the communication function portion.

According to the present invention, it is possible to provide a communication environment. In particular, it is possible to provide a more comfortable communication environment for more users.

DETAILED DESCRIPTION OF THE PREFERRED EMBODIMENTS

Figure 1:
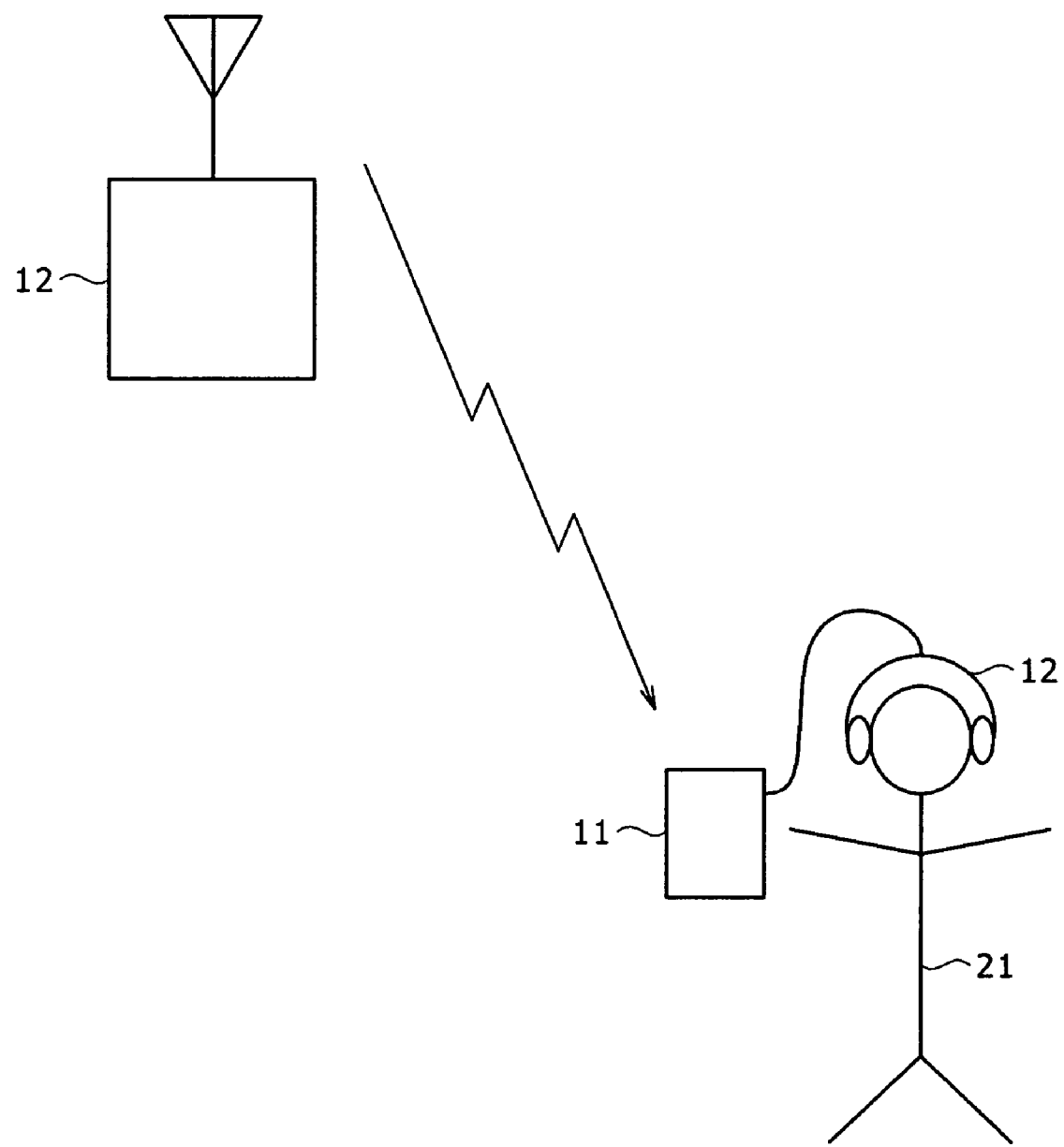
FIG. 1 is a view showing an example of a construction of a communication system according to the present invention.

Hereinafter, preferred embodiments of the present invention will be described in detail with reference to the accompanying drawings. FIG. 1 is a view showing a construction of an embodiment of a communication system according to the present invention.

In the figure, a terminal 11 is miniaturized enough for a user 21 to carry it, and has the same function as that of a mobile phone. That is, the portable terminal 11 makes a telephone call with other terminal such as a mobile phone through a base station, or makes transmission/reception of an e-mail with a server or the like on a network which is connected through the base station 12 by making communication with the base station 12 in a wireless manner. In addition, the portable terminal 11 receives data of contents such as musical piece data or image data which is transmitted from the base station 12 by utilizing a music delivery service, an Internet connection service, etc. of a mobile phone to accumulate the data of the contents in a recording medium for example which is installed in the portable terminal 11 itself.

Moreover, the portable terminal 11 also has a function as a portable audio (or visual) player, and is adapted to reproduce the data of the contents such as the musical piece data or the image data which is recorded in the recording medium. The user 21, for example, can look at or listen to desired contents even when he/she is traveling on a train, an airplane or the like, or in a desired place such as a place where he/she is out using a headphone 12 or the like connected to the portable terminal 11 which he/she carries.

Figure 2:
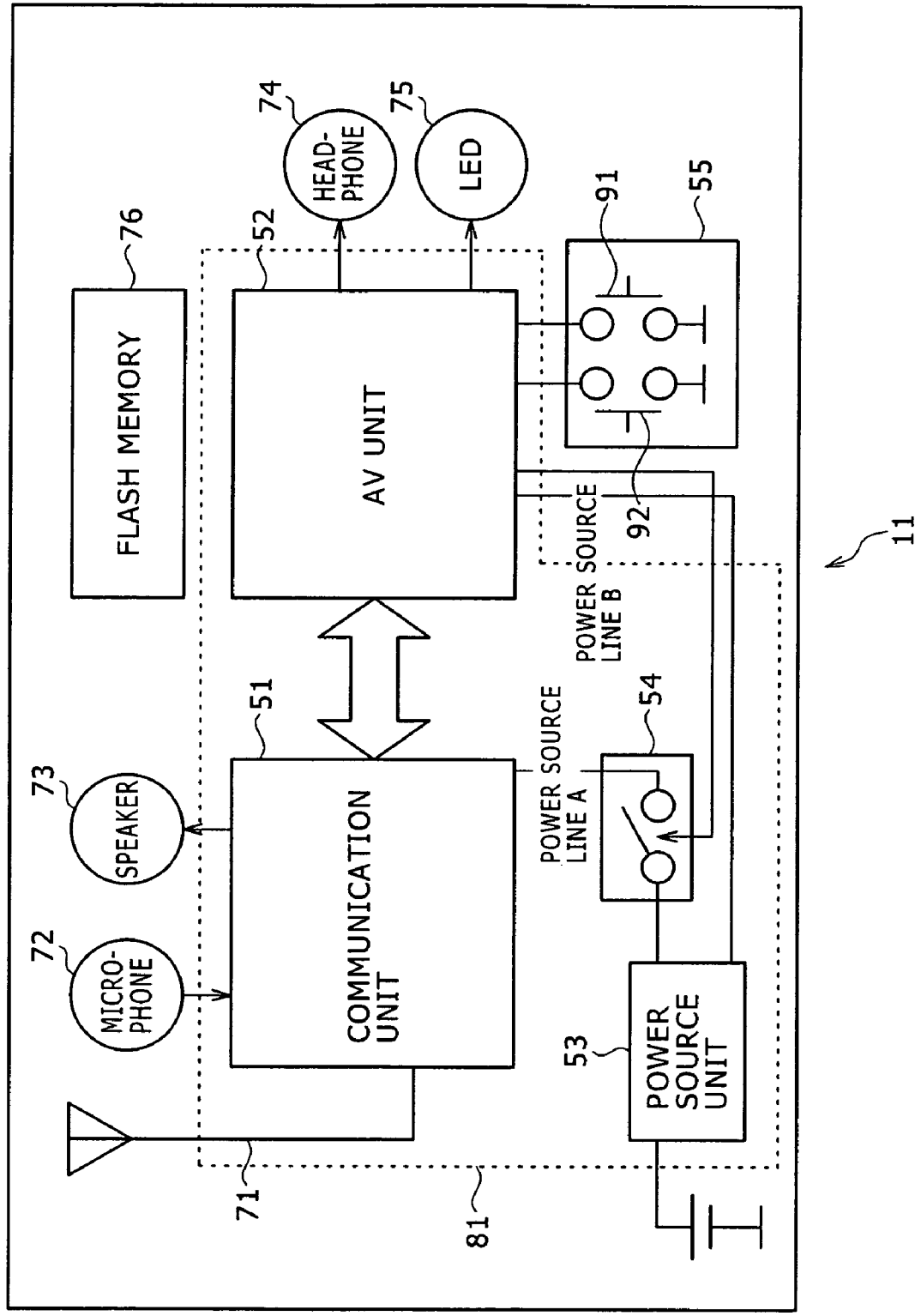
FIG. 2 is a block diagram showing an example of an internal configuration of a portable terminal shown in FIG. 1.

FIG. 2 is a block diagram showing an example of an internal configuration of the portable terminal 11 shown in FIG. 1. In this example, the portable terminal 11 includes a communication unit 51, an Audio Video (AV) unit 52, a power source unit 53, a switching unit 54, an operation unit 55.

The communication unit 51 is a function block for making radio-communication with the base station 12 by using a communication system of a Global System for Mobile Communications (GSM) for example to realize a mobile phone function of the portable terminal 11. An antenna 71 through which input or output of a transmission/reception electric wave to/from the base station 12 is made, a microphone 72 to which a call voice of the user 21 is inputted, and a speaker 73 through which a voice of a user with whom the user 21 possessing the portable terminal 11 is calling, a predetermined operation sound or the like is outputted are connected to the communication unit 51. It should be noted that the communication system of the communication unit 51 is not limited to only the GSM, and thus other communication system such as a Code Division Multiple Access (CDMA) 2000 may also be adopted.

The AV unit 52 is a function block for reproducing data of contents recorded in a recording medium to output an image or an audio signal of the contents, thereby realizing a portable audio (or visual) player function of the portable terminal 11. In this example, a flash memory 76 is connected as a recording medium for recording therein the data of the contents to the AV unit 52. In addition, a headphone terminal 74 for outputting therethrough an audio signal contained in the reproduced contents is connected to the AV unit 52. Thus, the headphone 12 is connected to the headphone terminal 74, whereby the user 21, for example, can listen to a musical piece as the reproduced contents. Incidentally, it is supposed that when an image is contained in the contents reproduced by the AV unit 52, a signal of the reproduced image is outputted to a display device (not shown) or the like.

The power source unit 53 supplies a power required to drive (activate) the portable terminal 11 to the individual portions of the portable terminal 11, respectively. The power source unit 53 supplies the power to the communication unit 51 through a power source line A, and supplies the power to the AV unit 52 through a power source line B different from the power source line A.

The switching unit 54 drives an internal switch in accordance with a control signal outputted from the AV unit 52 so that the internal switch is opened or closed, thereby connecting or disconnecting the power source line A as a power supply line extending from the power source unit 53 to or from the communication unit 51 if necessary.

In addition, the AV unit 52 makes communication with the communication unit 51 to turn ON, turn OFF, or turn ON and OFF a Light Emitting Diode (LED) 75 based on a status representing an operation state of the communication unit 51.

The operation unit 55 is constituted in the form of a button or a key which the user can operate in a state of grasping the portable terminal 11. In this example, buttons 91 and 92 are provided in the operation unit 55. The button 91 is provided as a main power source switch (main switch) of the portable terminal 11. When the button 91 is depressed, the power source unit 53 supplies the power to the overall portable terminal 11 including both the communication unit 51 and the AV unit 52 to activate the portable terminal 11.

When the button 92 is depressed in this state, the AV unit 52 outputs a control signal to the switching unit 54 to disconnect the power source line A from the communication unit 51, thereby cutting off the supply of the power to the communication unit 51. Moreover, when the button 92 is depressed again in this state, the AV unit 52 outputs a control signal to the switching unit 54 to connect the power source line A to the communication unit 51, thereby supplying the power to the communication unit 51. Incidentally, when the main switch (the button 91) is depressed again in a state in which the power source of the portable terminal 11 is in a turn-ON state (in a state in which the portable terminal 11 is driven), the supply of the power to the overall portable terminal 11 including both the communication unit 51 and the AV unit 52 is stopped.

That is, the button 91 as the main switch of the portable terminal 11 is depressed, thereby issuing an instruction to activate or stop the portable terminal 11. The button 92 is depressed while the portable terminal 11 is driven, thereby issuing an instruction to activate or stop the communication unit 51 as the unit which provides the mobile phone function of the portable terminal 11. In addition, the AV unit 52 for reproducing the data of the contents is not stopped while the portable terminal 11 is driven. Thus, the AV unit 52 controls the switching unit 54 based on the operation for the button 92 to control the supply of the power from the power source unit 53 to the communication unit 51, thereby activating or stopping the communication unit 51. At that, a time relationship between the operation for the button 92 and the activation of the communication unit 91 or the AV unit 92 will be described later with reference to FIGS. 6 and 7.

In such a manner, the user 21 can stop the mobile phone function of the portable terminal 11 and can activate the mobile phone function of the portable terminal 11 again while the contents are reproduced by operating the button 92 of the operation unit 55. Thus, for example, when the user 21 carries the portable terminal 11 on an airplane, a train, a hospital, etc., he/she can simply stop the mobile phone function. As a result, it is possible to provide a comfortable communication environment for not only the user 21, but also those around the user 21.

In this example, the description has been given such that when the button 91 as the main switch is depressed, the power source unit 53 supplies the power to both the communication unit 51 and the AV unit 52, respectively. Alternatively, the procedure may also be adopted such that when the button 91 as the main switch is depressed, the power source unit 53 supplies the power to the AV unit 52, and when the button 92 is depressed in this state, the AV unit 52 outputs the control signal to the switching unit 54 and the power source line A is connected to the communication unit 51, so that the power is supplied to the communication unit 51.

In addition, while not illustrated in the figure, it is supposed that an operation inputting portion for receiving an operation input such as an originating call of the mobile phone, production or transmission/reception of an e-mail, or download or reproduction/stop of contents is provided separately from the operation unit 55, and the various kinds of instructions (control signals) which are inputted through the operation inputting portion based on the operation by the user 21 are outputted to the communication unit 51 and the AV unit 52. At that, the operation inputting portion, for example, may be constituted by a display device for displaying thereon the operation contents, and a zero to nine numeric key and several kinds of symbol keys similarly to the general mobile phone, or may be constituted by a display device for displaying thereon the operation contents, keys for moving a cursor, and a key for issuing an instruction to select one(s) from among displayed items.

At that, in the portable terminal 11 which is actually manufactured, the communication unit 51, the AV unit 52, the power source unit 53, and the switching unit 54, for example, may be constituted in the form of a unit 81, indicated by a dotted line in the figure, on one substrate or the like. In this case, the communication unit 51, the AV unit 52, the power source unit 53, and the switching unit 54 are made as the respective function blocks constituting the unit 81. In this case as well, however, as described above, the power is supplied to the function block corresponding to the communication unit 51, or the function block corresponding to the AV unit 52, whereby the user 21 also can stop the mobile phone function of the portable terminal 11, or activate the mobile phone function thereof again, while reproducing contents, by operating the button 92 of the operation unit 55.

Figure 3:
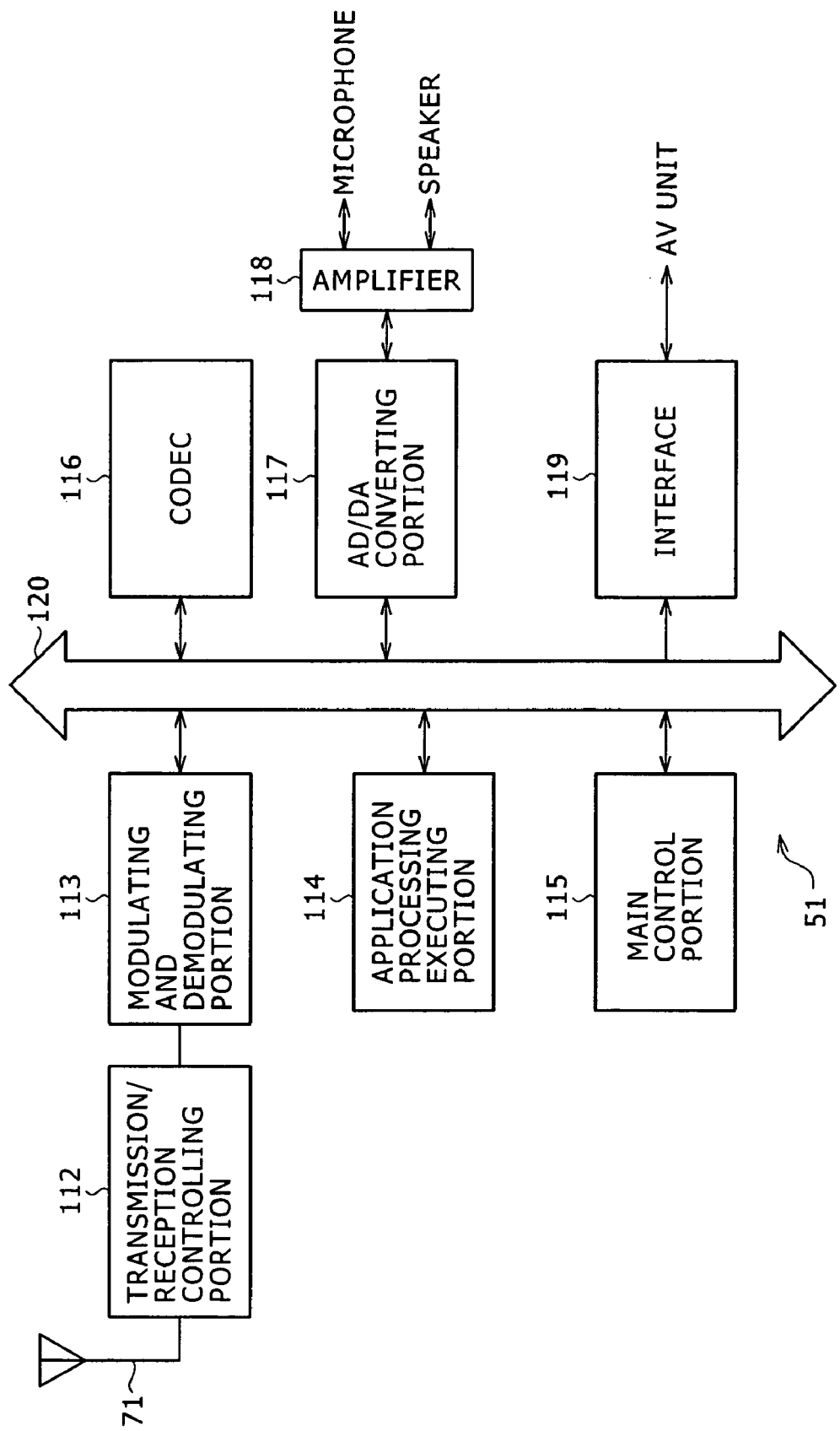
FIG. 3 is a block diagram showing an example of a detailed configuration of a communication unit shown in FIG. 2.

FIG. 3 is a block diagram showing an example of a detailed configuration of the communication unit 51. In the figure, the antenna 71 receives thereat a received signal transmitted from the base station 12, outputs the received signal to a transmission/reception controlling portion 112, and transmits therethrough a transmission signal which is outputted from the transmission/reception controlling portion 112 in order to be transmitted to the base station 12.

For example, the received signal which is received at the antenna 71 during the voice call phase is amplified and subjected to frequency conversion processing and analog to digital conversion processing in the transmission/reception controlling portion 112, and outputted to a modulating and demodulating portion 113. The modulating and demodulating portion 113 subjects the signal outputted from the transmission/reception controlling portion 112 to spectrum inverse diffusion processing, and output the resulting signal to a CODEC 116. The resulting signal is decoded into a digital signal having a predetermined format by the CODEC 116, and the resulting digital signal is outputted to an AD/DA converting portion 117. The outputted signal is converted into an analog audio signal by the AD/DA converting portion 117. The analog signal is then amplified by an amplifier 118, and a voice corresponding to the analog audio signal is outputted through a speaker.

In addition, the signal of the sound which is collected with a microphone during the voice call phase is outputted to the AD/DA converting portion 117 through the amplifier 118. The outputted audio signal is then converted into a digital signal by the AD/DA converting portion 117 and outputted to the CODEC 116. After the outputted signal is converted (encoded) into digital audio data having a predetermined format by the CODEC 116, the resulting digital audio signal is subjected to spectrum diffusion processing in the modulating and demodulating portion 113. The resulting data is subjected to digital to analog conversion processing and frequency conversion processing in the transmission/reception controlling portion 112, and the resulting data is then transmitted through the antenna 71.

A main control portion 115 constituted by a Central Processing Unit (CPU), a Read Only Memory (ROM), a Random Access Memory (RAM), etc. controls the individual portions constituting the communication unit 51 based on an operation input by the user 21 which is received in an operation inputting portion (not shown). In addition, the main control portion 115 manages a status as information representing an operation situation of the communication unit 51 such as a call processing phase, a data reception phase, or a data transmission phase, and outputs the status information to the AV unit 52 when necessary. As a result, the AV unit 52 can determine whether or not at present, there is execution of the processing by the communication unit 51.

An application processing executing portion 114 is also constituted by a CPU, a ROM, a RAM, etc. and executes the various kinds of application processing, other than the voice call, such as processing for downloading data of contents by utilizing transmission/reception of an e-mail, a music delivery service or the like. Incidentally, the data of the contents which is downloaded by the application processing executing portion 114 is recorded in a recording medium such as the flash memory 76 installed in the AV unit 52.

The individual blocks described above and an interface 119 are connected to each other through a bus 120. The interface 119 controls transmission/reception of the data to/from the AV unit 52.

It should be noted that the configuration of the communication unit 51 is not limited to thereto, and thus any other configuration may be adopted as long as it can realize the above-mentioned functions. For example, the communication unit 51 may also be configured by using an IC chip, etc. for the mobile phone which is manufactured for the purpose of being utilized in the general mobile phone and distributed in the market. Thus, the compact portable terminal 11 can be realized at low cost.

Figure 4:
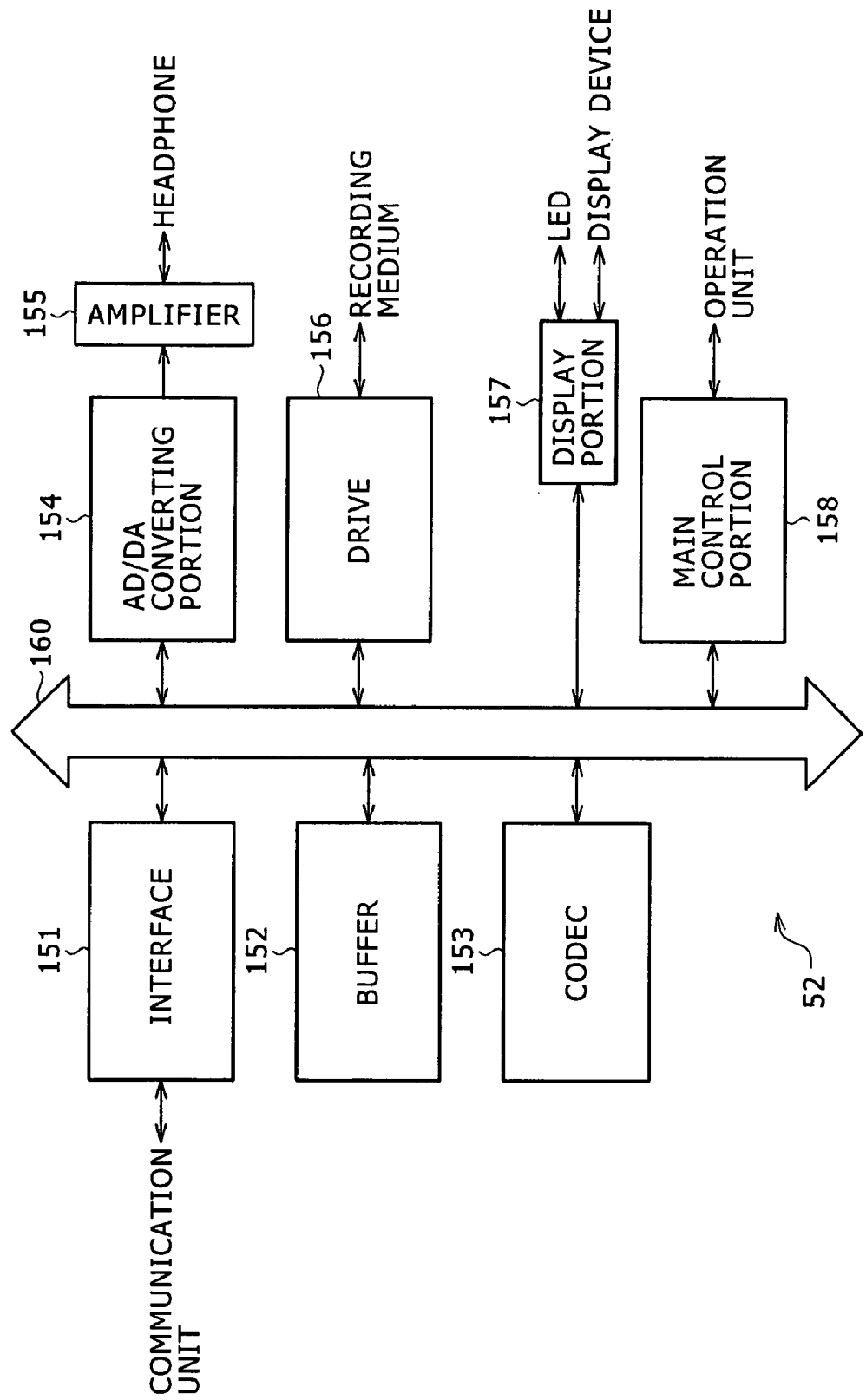
FIG. 4 is a block diagram showing an example of a detailed configuration of an AV unit shown in FIG. 2.

FIG. 4 is a block diagram showing an example of a detailed configuration of the AV unit 52 shown in FIG. 2. As shown in the figure, individual blocks constituting the AV unit 52 are connected to one another through a bus 160. A drive 156 reads out data of contents from the recording medium (e.g., the flash memory 76 shown in FIG. 2) installed in the drive 156 or records data of contents supplied from the communication unit 51 through an interface 151 in the recording medium in accordance with the control made by the main control portion 153.

In the present invention, the recording medium in which the data of the contents is recorded is installed in the drive 156 provided in the AV unit 152. Hence, even when the user 21 carries the portable terminal 11 on an airplane, a train, a hospital, etc. and thus stops the mobile phone function, the contents can be continuously reproduced.

The data of the contents which is read out from the recording medium through the drive 156, or the data of the contents which is supplied from the communication unit 51 through the interface 151 is accumulated in a buffer 152. A CODEC 153 reads out the data of the contents from the buffer 152, and decodes the data (e.g., execute processing for decoding the compressed or encoded data) to reproduce the contents. The data of the reproduced contents is converted into an analog signal in an AD/DA converting portion 154, and outputted from a headphone for example through an amplifier 155. At that, it is supposed that when an image is contained in the contents, an image signal is outputted to a display device or the like connected to the bus 160 through a display portion 157.

A main control portion 158 constituted by a CPU, a ROM, a ROM, etc. controls the individual portions constituting the AV unit 52. In addition, the main control portion 158 outputs a control signal used to control the driving of the switching unit 54 in accordance with an instruction inputted through the operation unit 55 by the user 21. Moreover, the main control portion 158 outputs a signal used to control the display portion 157, and controls light emission of the LED 75 connected to the bus 160 through the display portion 157. In addition, the display portion 157 also controls the display of the display device. The main control portion 158 changes a power supply mode for the AV unit 52 from one mode to another mode by controlling the power supplied to the AV unit 52 through the power source line B.

Here, it is supposed that two kinds of modes, i.e., a normal mode in which the power is supplied to all the individual portions constituting the AV unit 52, and a standby mode in which the power is supplied to only the main control portion 158 among the individual portions of the AV unit 52 are previously set as the power supply modes. For example, when the processing for reproducing the contents is stopped, the main control portion 158 changes the power supply mode from the normal mode over to the standby mode, thereby suppressing the consumed power.

It should be noted that the recording medium installed in the drive 156 is not limited to only the flash memory 76, and thus removable media such as a magneto disc, an optical disc, a magneto-optical disc, or a semiconductor memory may be suitably installed in the drive 156.

Also, it should be noted that the AV unit 52 may be configured in the form of one IC chip similarly to the communication unit 51.

Figure 5:
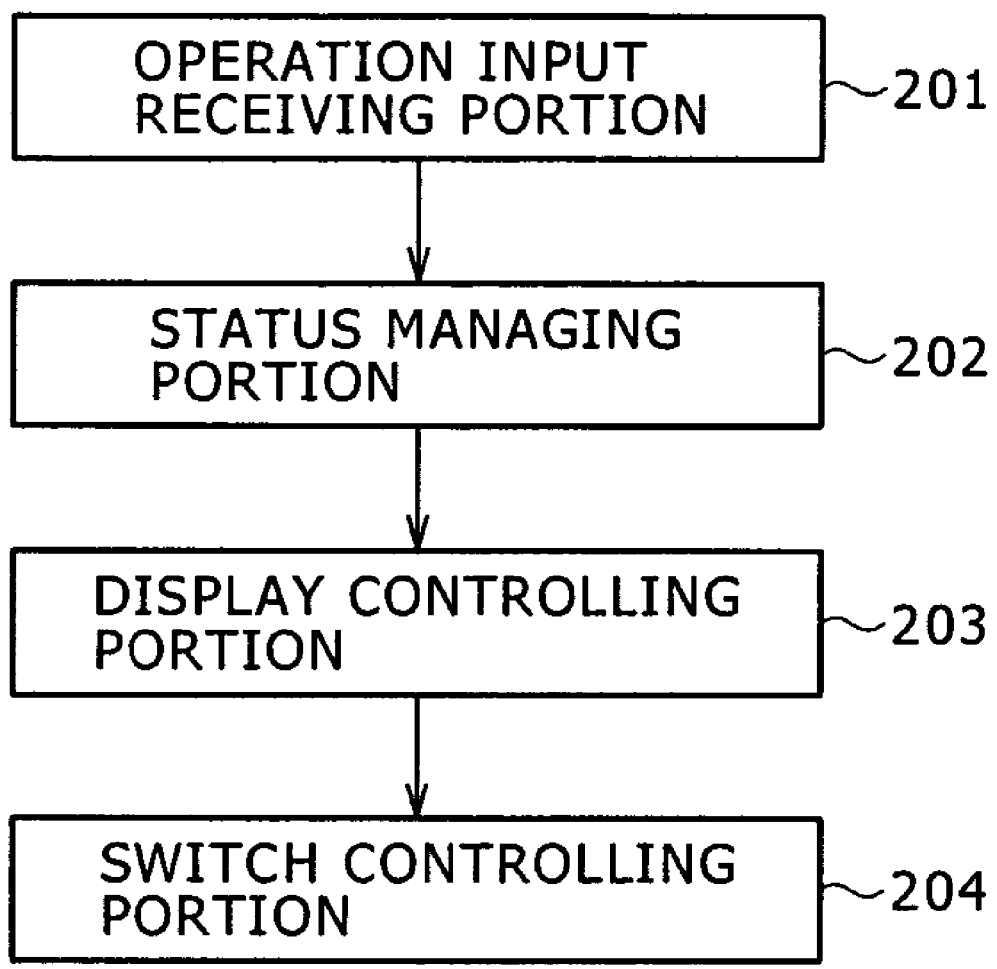
FIG. 5 is a block diagram showing an example of a functional structure of a program which is executed by a main control portion shown in FIG. 4.

FIG. 5 is a block diagram showing an example of a functional structure of a program which is executed in the CPU of the main control portion 158 shown in FIG. 4. In the figure, an operation input receiving portion 201, for example, receives an operation input which is inputted through the operation unit 55 by the user 21 and outputs the operation input to a status managing portion 202. The status managing portion 202 checks the status of the communication unit 51 and outputs the check results to a display controlling portion 203. In addition, the status managing portion 202 manages the status together as the information representing whether or not the AV unit 52 is reproducing the contents.

The display controlling portion 203 controls the driving of the display portion 157 based on the output results from the status managing portion 202 to cause the LED 75 to emit light. The display controlling portion 203, for example, executes the processing for turning ON and OFF the LED 75 in a case where when the status of the communication unit 51 is in the call processing phase, the data reception phase, or the data transmission phase, an instruction to stop the function of the communication unit 51 (stop the mobile phone function) is issued, and executes the processing for turning OFF the LED 75 in a case where when the status of the communication unit 51 is not in any of the call processing phase, the data reception phase, or the data transmission phase (when there is no execution of the processing by the communication unit 51), an instruction to stop the function of the communication unit 51 (stop the mobile phone function) is issued.

A switch controlling portion 204 receives the processing results from the operation input receiving portion 201, the status managing portion 202 and the display controlling portion 203, and executes the processing for controlling the switching unit 54 to disconnect or connect the above-mentioned power source line A from or to the communication unit 51 based on the operation input made by the user 21, thereby controlling the supply of the power to the communication unit 51. For example, in a case where when the status of the communication unit 51 is in the call processing phase, the data reception phase, or the data transmission phase, the instruction to stop the function of the communication unit 51 is issued, the switch controlling portion 204 makes the control so as to interrupt the supply of the power to the communication unit 51 after waiting until there has been performed no execution of the processing by the communication unit 51.

Next, a description will be given with respect to a time relationship between the operation for the button 92 of the operation unit 55, and ON/OFF of the power sources of the communication unit 51 and the AV unit 52 with reference to timing charts shown in FIGS. 6 and 7.

Figure 6:
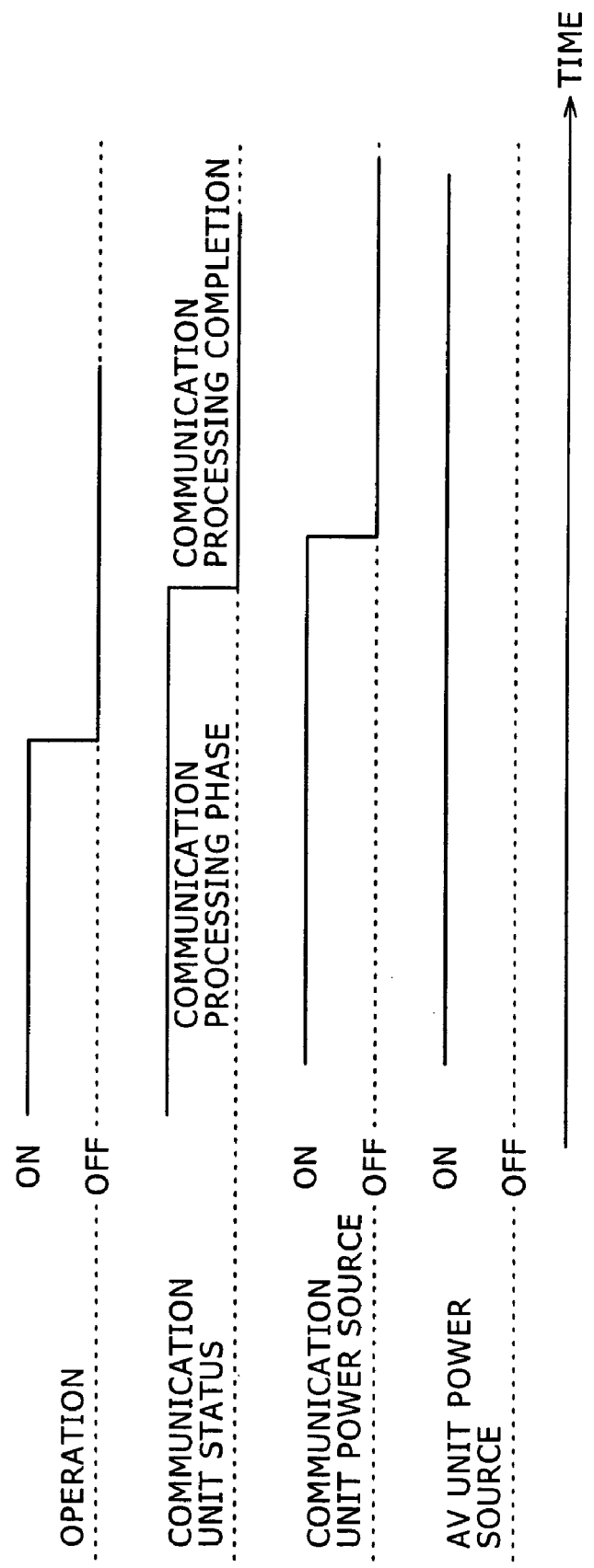
FIG. 6 is a timing chart explaining a time relationship between an operation of a button, and ON/OFF of power sources of the communication unit and the AV unit.

FIG. 6 is a timing chart in a case where the button 92 is depressed to stop the communication unit 51 in a state in which the communication unit 51 is driven (in a state in which the power source line A is connected to the communication unit 51). In the figure, an axis of abscissa represents time. In addition, it is supposed that the time goes by (elapses) from a left-hand side to a right-hand side in the figure. As shown in the figure, when the instruction to turn OFF the communication circuit 51 is issued by the operation (by depressing the button 92), after the time elapses a little, the status of the communication unit 51 changes from the communication processing phase to the completion of the communication processing. That is, the communication unit 51 completes the communication processing being executed after the instruction to turn OFF the communication unit 51 is issued by the operation. Hence, after the time elapses a little, the status of the communication unit 51 changes from the communication processing phase to the completion of the communication processing.

When the status of the communication unit 51 changes from the communication processing phase to the completion of the communication processing, the power source of the communication unit 51 is turned OFF almost simultaneously with that change. That is, the AV unit 52 which verifies that the status of the communication unit 51 has become the completion of the communication processing controls the switching unit 54 to disconnect the power source line A from the communication unit 51, thereby turning OFF the power source of the communication unit 51.

Incidentally, the power source of the AV unit 52 is held turned ON during this operation.

Figure 7:
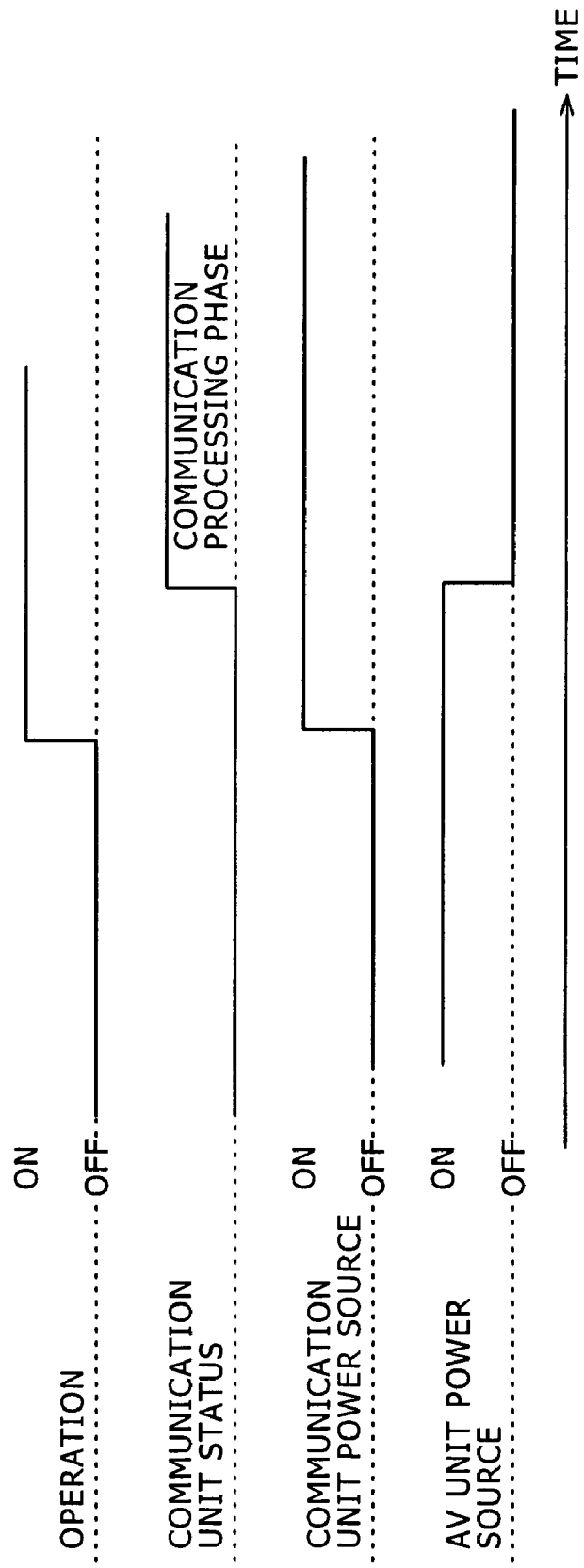
FIG. 7 is a timing chart explaining a time relationship between the operation of the button, and ON/OFF of the power sources of the communication unit and the AV unit.

FIG. 7 is a timing chart in a case where the button 92 is depressed to activate the communication unit 51 in a state in which the communication unit 51 is stopped (in a state in which the power source line A is disconnected from the communication unit 51). In the figure, an axis of abscissa represents time. In addition, it is supposed that the time goes by (elapses) from a left-hand side to a right-hand side in the figure. As shown in the figure, when the instruction to turn ON the communication unit 51 is issued by the operation (by depressing the button 92), the power source of the communication unit 51 is turned ON almost simultaneously with that operation. In addition, after the power source of the communication unit 51 is turned ON, the communication processing is started at arbitrary timing by the communication unit 51, and the status of the communication unit 51 changes to the communication processing phase.

Moreover, when the instruction to turn ON the communication unit 51 is issued by the operation (by depressing the button 92), after the time elapses a little, the power source of the AV unit 52 is turned OFF (exactly speaking, the AV unit 52 is set to a standby mode and thus the power consumption is suppressed). That is, after the instruction to turn ON the communication unit 51 is issued by the operation, the AV unit 52 stops the reproduction of the contents and enters the standby mode. Hence, after the time elapses a little, the power source of the AV unit 52 is turned OFF.

Next, a description will be given with respect to processing for controlling the operation of the portable terminal 11 by the main control portion 158 with reference to flow charts shown in FIGS. 8 and 9. This processing is executed while the power is supplied to the AV unit 52 through the power source line B. That is, this processing is executed for a period of time from a point when once the main switch (e.g., the button 91) of the portable terminal 11 is depressed to a point when the main switch of the portable terminal 11 is depressed again. At that, in this example, it is supposed that the setting is made such that when the button 91 as the main switch is depressed, the power source unit 53 supplies the power to the AV unit 52, and when the button 92 is depressed in this state, the AV unit 52 outputs the control signal to the switching unit 54 to connect the power source line A to the communication unit 51, thereby supplying the power to the communication unit 51.

In step S1, the operation input receiving portion 201 determines whether or not an instruction to activate the communication unit 51 is issued through the operation input by the user 21, and stands by until it is determined that the instruction to activate the communication unit 51 is issued.

For example, when the button 92 shown in FIG. 2 is depressed, the operation input receiving portion 201 determines that the instruction to activate the communication unit 51 is issued through the operation input by the user 21. When it is determined in step S1 that the instruction to activate the communication unit 51 is issued, the processing proceeds to step S2.

In step S2, the status managing portion 202 determines whether or not the AV unit 52 is reproducing the contents. When it is determined in step S2 that the AV unit 52 is reproducing the contents, the processing proceeds to step S3.

In step S3, the display controlling portion 203 causes the display device to display thereon a message representing whether or not it is necessary to stop the reproduction of the contents, i.e., a message urging the user 21 to select whether or not it is necessary to stop the reproduction of the contents being currently reproduced. At this time, the user 21, for example, performs the operation for selecting an icon for issuing an instruction to stop the reproduction of the contents based on the display on the display device, thereby issuing the instruction to stop the reproduction of the contents.

For example, in a case where when the user 21 reproduces and listens to the musical piece as the contents, he/she needs to make a telephone call using his/her own mobile phone, a flow of the musical piece (the continuous output of the sound) becomes a hindrance to the telephone call using the mobile phone in some cases. In such cases, the user 21 can issue an instruction to stop the reproduction of the contents to stop the flow of the musical piece.

In step S4, the operation input receiving portion 201 determines whether or not the instruction to stop the reproduction of the contents is issued. When it is determined in step S4 that the instruction to stop the reproduction of the contents is issued, the processing proceeds to step S5.

In step S5, the switch controlling portion 204 sets a mode of the AV unit 52 to the standby mode. As a result, the power consumption in the AV unit 52 is suppressed. However, as described above, the power is continuously supplied to the main control portion 158 of the AV unit 52 without a break while the mode of the AV unit 52 is set to the standby mode. Thus, the status of the communication unit 51 notified from the communication unit 51 is updated while the mode of the AV unit 52 is set to the standby mode. In addition, the main control portion 158 can control the switching unit 54 based on the input through the operation unit 55 while the mode of the AV unit 52 is set to the standby mode.

After completion of the processing in step S5, in step S6, the processing for activating the communication unit is executed. Here, a description will be given with respect to the details of the processing for activating the communication unit 51 in step S6 shown in FIG. 8 with reference to a flow chart shown in FIG. 10.

Figure 10:
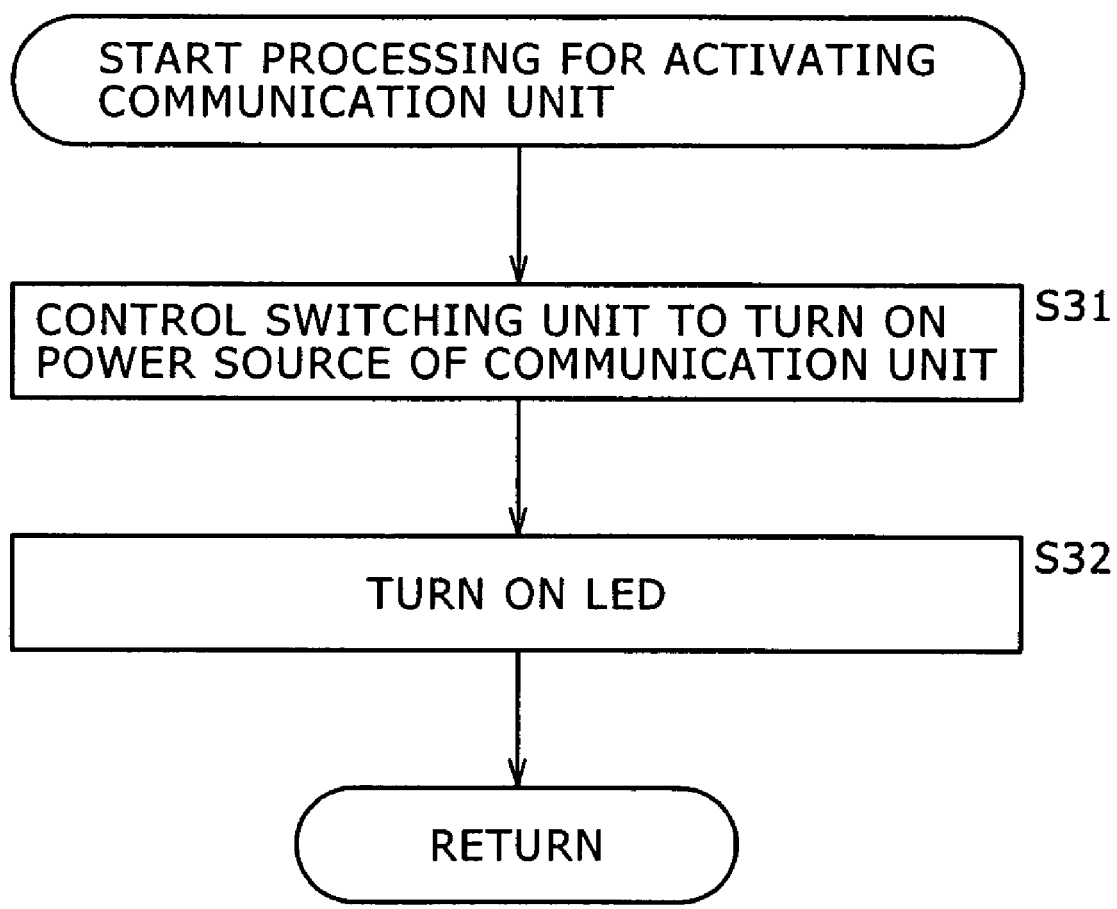
FIG. 10 is a flow chart explaining processing for activating the communication unit.

In step S31 of FIG. 10, the switch controlling portion 204 controls the switching unit 54 to turn ON the power source of the communication unit 51. At this time, the power source line A is connected to the communication unit 51, so that the power source unit 53 starts to supply the power to the communication unit 51.

In step S32, the display controlling portion 203 turns ON the LED 75. As a result, the user 21 or those around the user 21 are informed of that the communication unit 51 is activated and thus the mobile phone function of the portable terminal 11 is in operation.

In such a manner, the communication unit 51 is activated.

Figure 11:
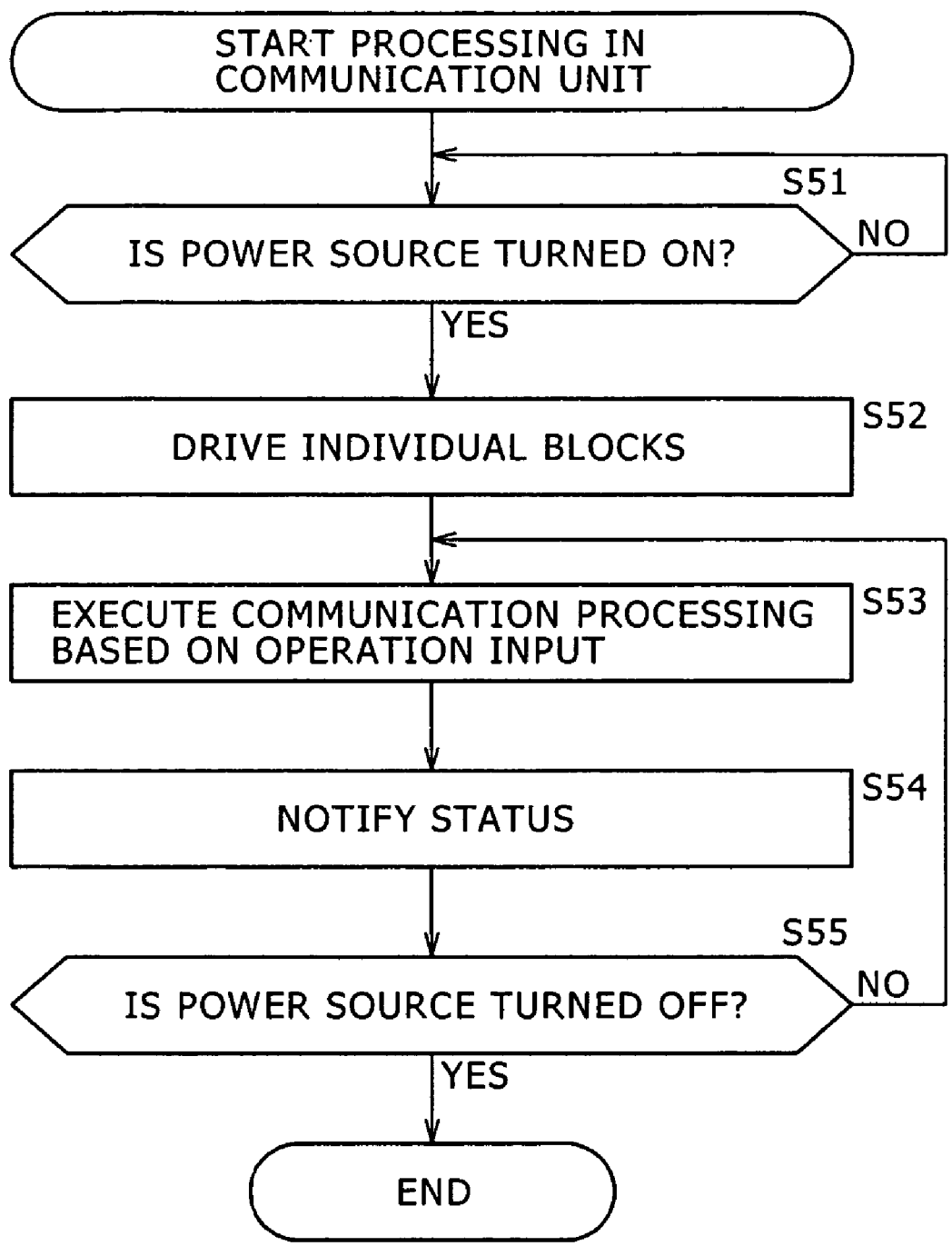
FIG. 11 is a flow chart explaining processing in the communication unit.

Here, the processing in the communication unit 51 will be described with reference to a flow chart shown in FIG. 11.

In step S51, the main control portion 115 of the communication unit 51 determines whether or not the power source of the communication unit 21 is turned ON, and waits until it is determined that the power source of the communication unit 51 is turned ON. When the power source of the communication unit 51 is turned ON in step S31 shown in FIG. 10, it is determined in step S51 as well that the power source of the communication unit 51 is turned ON, and the processing proceeds to step S52.

In step S52, the main control portion 115 drives the individual blocks constituting the communication unit 51.

In this example, the processing in steps S51 and S52 is described as the processing which is executed by the main control portion 115. However, the processing in steps S51 and S52 may also be automatically executed when the power is started to be supplied to the communication unit 51.

In step S53, the main control portion 115 executes the communication processing based on the operation input by the user 21. At this time, for example, the processing for a call with other mobile phone or the like, the processing for transmitting/receiving an e-mail, the processing for downloading the data of the contents, etc. are executed.

In step S54, the main control portion 115 informs the AV unit 52 of the status of the communication unit 51. The status of the communication unit 51 of which the AV unit 52 is informed is received by the main control portion 158 through the interface 151 of the AV unit 52 and preserved in a memory or the like built in the main control portion 158. At that, the status of the communication unit 51 preserved in the main control portion 158 of the AV unit 52 is updated whenever the main control portion 115 informs the AV unit 52 of a new status of the communication unit 51.

In step S55, the main control portion 115 determines whether or not the power source of the communication unit 51 is turned OFF. When it is determined in step S55 that the power source of the communication unit 51 is not turned OFF, the processing returns back to step S53, and the subsequent processing is repeatedly executed.

For example, when processing of step S71, shown in FIG. 12, which will be described later is executed, it is determined in step S55 that the power source of the communication unit 51 is turned OFF, and the processing is completed.

In such a manner, the main control portion 115 informs the AV unit 52 of the status of the communication unit 51 while the power is supplied to the communication unit 51. As a result, it can be determined in the AV unit 52 as well whether or not currently, there is the execution of the processing by the communication unit 51.

Figure 8:
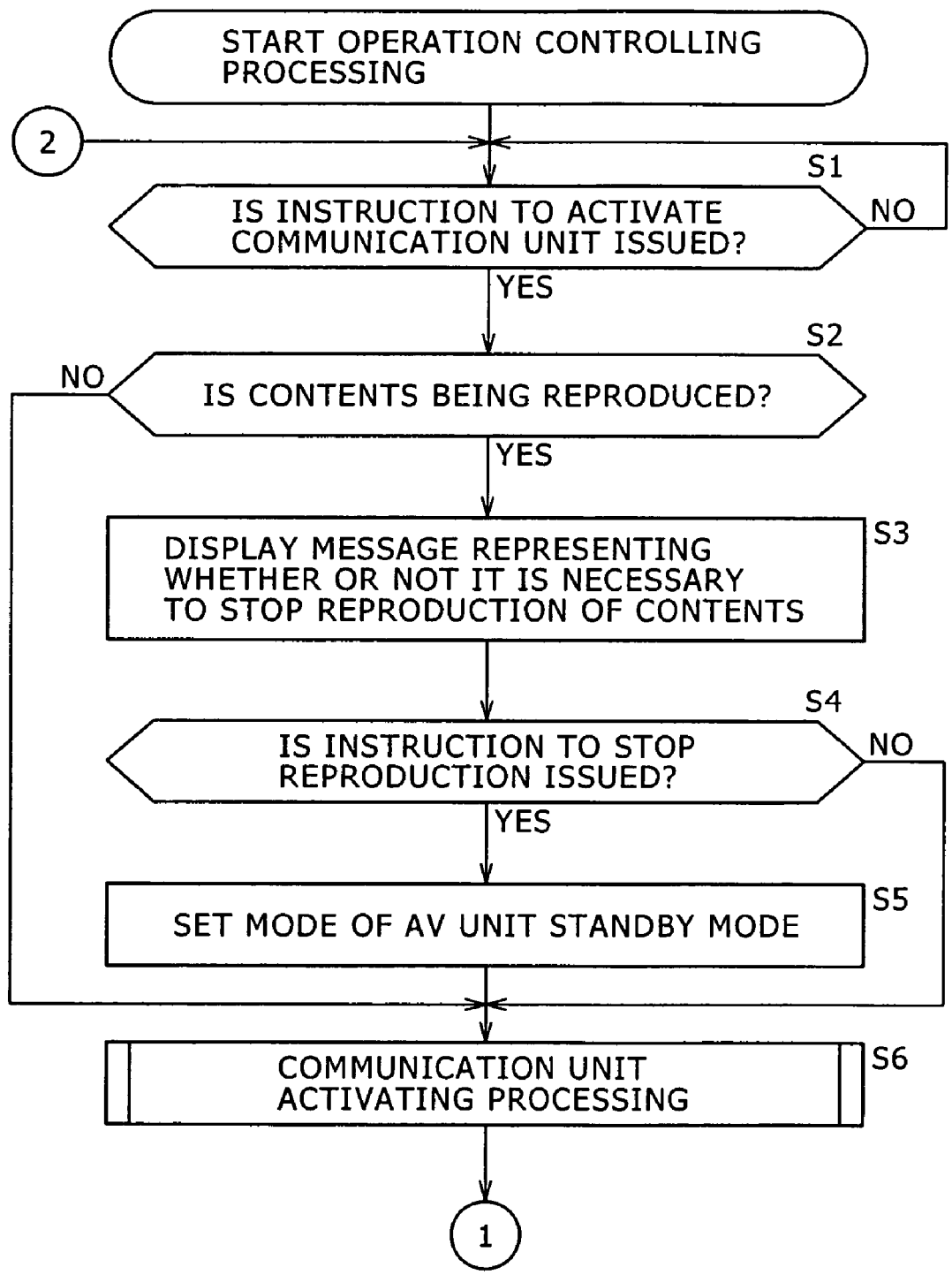
FIG. 8 is a flow chart explaining operation controlling processing.
Figure 9:
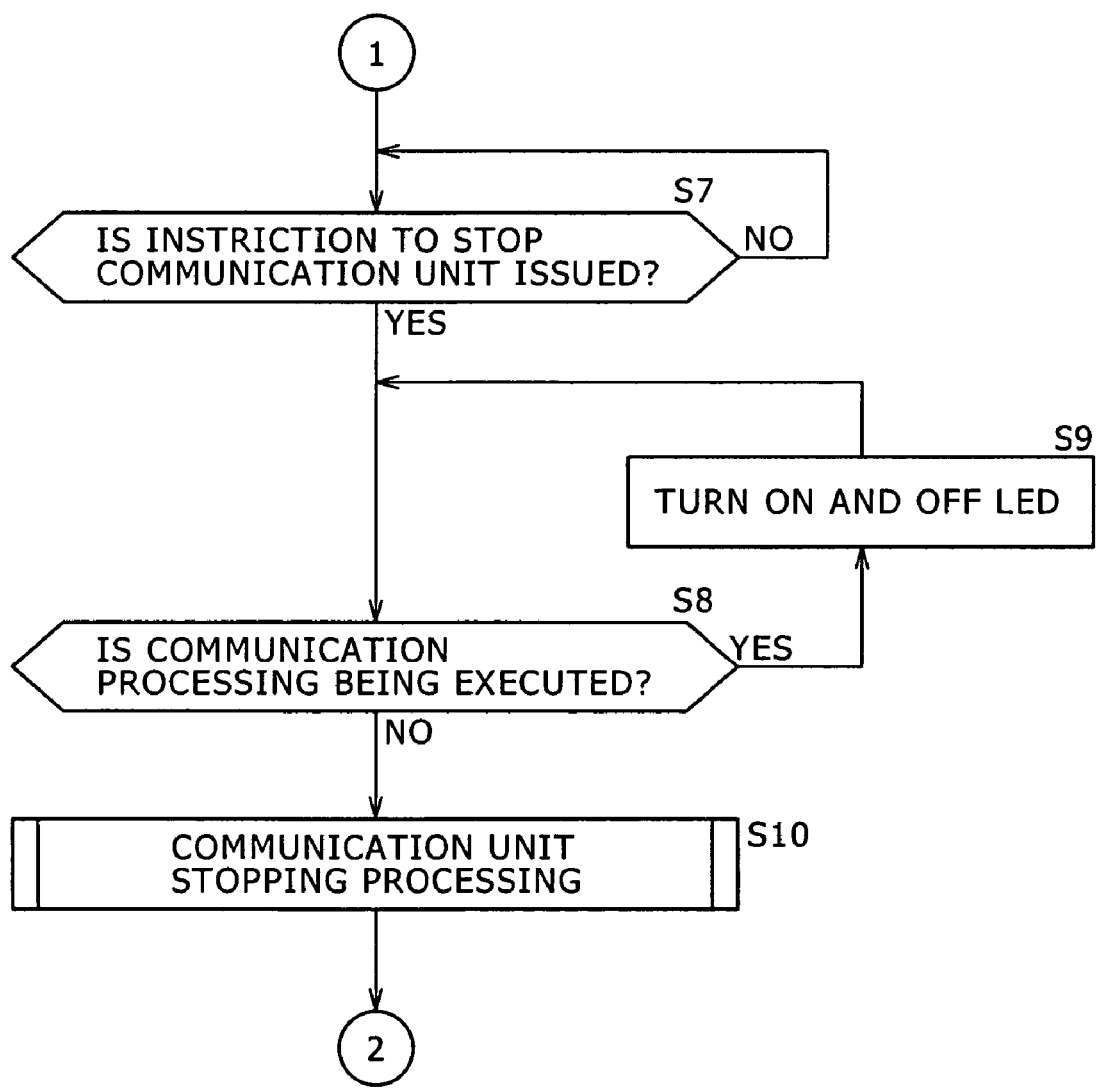
FIG. 9 is a flow chart explaining the operation controlling processing.

Referring back to FIG. 8, after completion of the processing of step S6, the operation input receiving portion 201 determines in step S7 of FIG. 9 whether or not the instruction to stop the communication unit 51 is issued.

For example, when the button 92 shown in FIG. 2 is depressed, the operation input receiving portion 201 determines that the instruction to stop the communication unit 51 is issued through the operation input by the user 21. When it is determined in step S7 that the instruction to stop the communication unit 51 is issued, the processing proceeds to step S8.

In step S8, the status managing portion 202 determines whether or not the status of the communication unit 51 is currently in the communication processing phase. At this time, the status managing portion 202 checks the status of the communication unit 51 preserved in the memory provided inside the main control portion 158. When the status of the communication unit 51 is in the call processing phase, the data reception phase, or the data transmission phase (When there is the execution of the processing by the communication unit 51), it is determined that the communication unit 51 is currently in the communication processing phase, and the processing proceeds to step S9.

In step S9, the display controlling portion 203 turns ON and OFF the LED 75 through the display portion 157. As a result, the user 21 or those around the user 21 are informed of that the communication unit 51 is intended to be stopped. Thereafter, the processing returns back to step S8.

When the processing in the communication unit 51 is completed, the status of the communication unit 51 preserved in the memory provided inside the main control portion 158 is updated, and thus it is determined in step S8 that the status of the communication unit 51 is not in the communication processing phase (When there is no execution of the processing by the communication unit 51), the processing proceeds to step S10.

Thereafter, in step S10, processing for stopping the communication unit 51 is executed. Here, a description will be given with respect to the details of the processing for stopping the communication unit 51 in step S10 shown in FIG. 9 with reference to a flow chart of FIG. 12.

Figure 12:
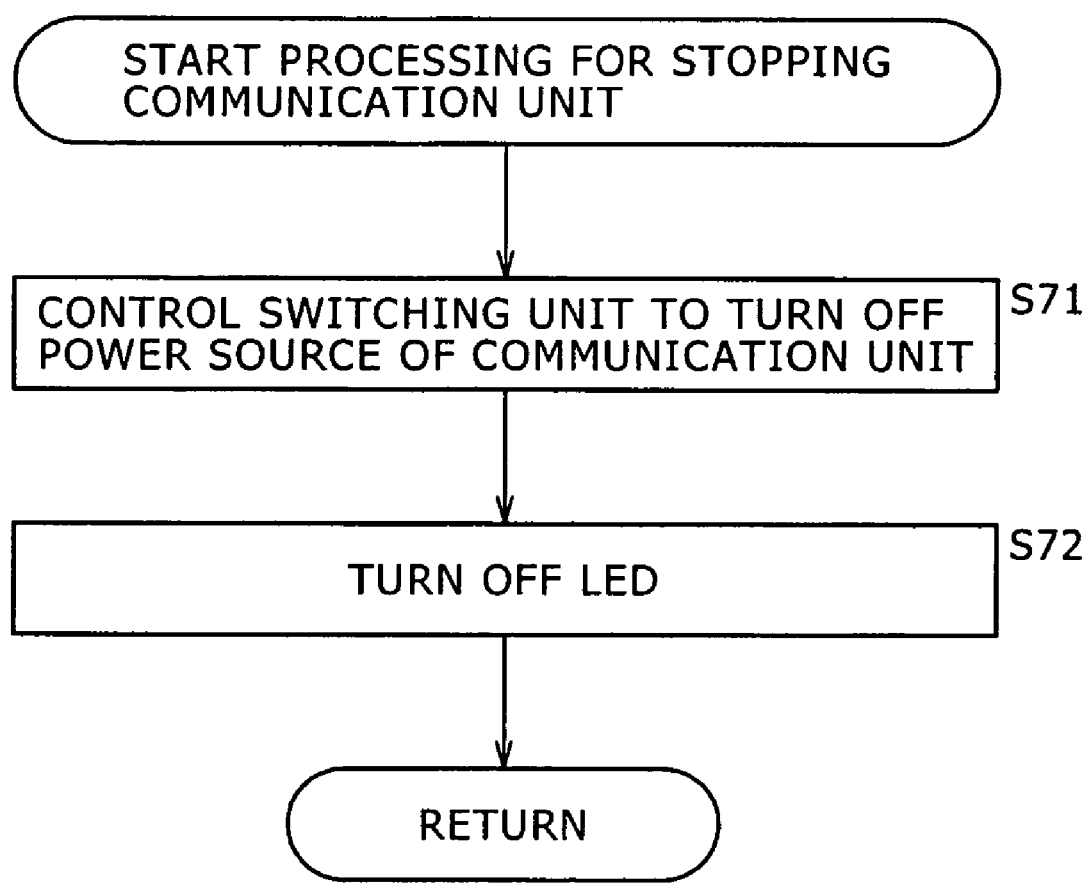
FIG. 12 is a flow chart explaining processing for stopping the communication unit.

In step S71 of FIG. 12, the switch controlling portion 204 controls the switching unit 54 to turn OFF the power source of the communication unit 51. At this time, the power source line A is disconnected from the communication unit 51, and thus the supply of the power from the power source unit 53 to the communication unit 51 is stopped.

In step S72, the display controlling portion 203 turns OFF the LED 75. As a result, the user 21 or those around the user 21 are informed of that the communication unit 51 is stopped and thus the mobile phone function of the portable terminal 11 is not in operation.

The communication unit 51 is stopped in such a manner.

Referring back to FIG. 9, after completion of the processing of step S10, the processing returns back to step S1 of FIG. 8.

It should be noted that when it is determined in step S2 that no contents are being reproduced, the processing from step S3 to step S5 is skipped. In addition, when it is determined in step S4 that no instruction to stop the reproduction is issued, the processing of step S5 is skipped.

In the present invention, the processing for controlling the operation of the portable terminal 11 is executed in such a manner, whereby the user 21 can stop the communication unit 51 to stop the mobile phone function of the portable terminal 11 without being nervous about whether or not the portable terminal 11 is in the communication processing phase by operating the operation unit 55. In addition, since the LED 75 is turned ON, turned ON and OFF, or turned OFF in correspondence to the status of the communication unit 51, it is possible to demonstrate clearly for not only the user 21 possessing the portable terminal 11, but also those around the user 21 whether or not the mobile phone function of the portable terminal 11 is currently in operation. Moreover, in the present invention, since not only the operation is changed by simply setting the mode as in the personal mode of the mobile phone in the past, but also the supply of the power to the communication unit 51 is stopped, it is possible to suppress the power consumption in the portable terminal 11.

In addition, the instruction to stop the communication unit 51 is issued by depressing the button 92. Hence, for example, the mobile phone function of the portable terminal 11 can be simply stopped as compared with a case where the mode is set to the personal mode by selecting the hierarchized menu as in the mobile phone in the past.

At that, while the description has been given with respect to the example in which the operation unit 55 is constituted by the button 91 as the main switch, and the switch 92 for issuing the instruction to activate/stop the communication unit 51 with reference to FIG. 2, the construction of the operation unit 55 may be further simplified.

Figure 13:
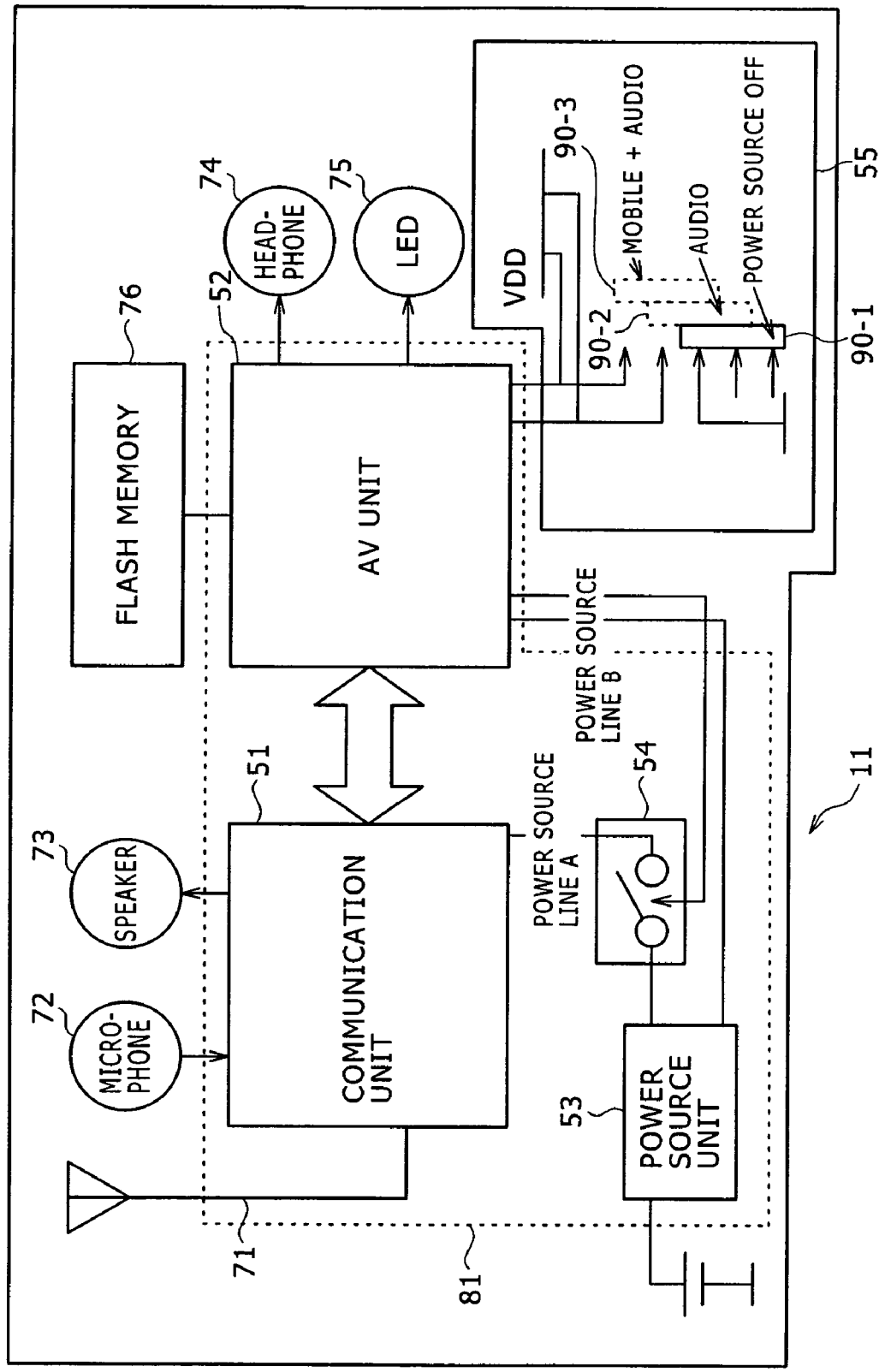
FIG. 13 is a block diagram showing another example of the internal configuration of the portable terminal shown in FIG. 1.

FIG. 13 is a block diagram showing another example of the internal configuration of the portable terminal 11 shown in FIG. 1. In the figure, the portions corresponding to those in FIG. 2 are designated with the same reference numerals. In this example, unlike the case of FIG. 2, the operation unit 55 is constituted by a switch 90 which can be set in three positions, i.e., a position 90-1 to a position 90-3. At that, while in the figure, for the sake of convenience, the switch 90 in the position 90-2 and the switch 90 in the position 90-3 are indicated by dotted lines, respectively. Actually, the single switch 90 is moved in a vertical direction in the figure by the operation by the user 21, whereby the switch 90 is set in one position, which the user 21 desires, of the three positions 90-1 to 90-3.

When the switch 90 is set in the position 90-1, the power source unit 53 supplies no power to the communication unit 51 and the AV unit 52, and thus the portable terminal 11 is in the OFF state.

When the switch 90 is set in the position 90-2, the power source unit 53 supplies the power to only the AV unit 52. That is, in the portable terminal 11, only the reproduction of the contents (e.g., the audio contents such as the musical piece) is performed by the AV unit 52, and thus the mobile phone function is in the stop state. In this case, as described above, the LED 75 is in the turn-OFF state.

When the switch 90 is set in the position 90-3, the power source unit 53 supplies the power to the communication unit 51 and the AV unit 52, respectively. That is, in the portable terminal 11, the communication processing is executed by the communication unit 51, and the contents (e.g., the audio contents such as the musical piece) are reproduced by the AV unit 52. Thus, the mobile phone function is in the activation state. In this case, as described above, the LED 75 is in the turn-ON state.

The operation unit 55 is constructed in such a manner, whereby the activation or stop of the mobile phone function in the portable terminal 11 can be more simply performed.

It should be noted that the above-mentioned series of processing can be executed by the hardware or software. When the above-mentioned series of processing is executed by the software, a program constituting that software is installed from the network such as the Internet, or the recording medium such as the removable media.

In this specification, steps of executing the above-mentioned series of processing includes the processing which is executed in parallel or individually even if not being necessarily processed in a time series manner as well as the processing which is executed in a time series manner along the described order.

What is claimed is:

1. An information processor comprising:
    a first function portion including communication means for executing processing relating to communication of data, and communication managing means for controlling said communication means and for managing information representing whether or not said communication means is executing the processing relating to the communication of the data;
    a second function portion different from said first function portion;
    instructing means for issuing an instruction to stop said first function portion;
    determining means provided in said second function portion for, when said instructing means issues the instruction to stop said first function portion, determining based on the information managed by said communication managing means whether or not said communication means is executing the communication processing; and
    stopping means provided in said second function portion for, when said determining means determines that said communication means is executing the communication processing, stopping said first function portion after the communication processing is completed;
    wherein said second function portion executes processing relating to reproduction of content data
    wherein said first function portion communicates with an other information processor to download content data, and records the content data in a recording medium installed in said second function portion, and said second function portion executes processing relating to reproduction of the content data recorded in said recording medium.

2. The information processor according to claim 1, further comprising:
    power supplying means for supplying a power used to drive said information processor itself; and
    supply controlling means for controlling a supply of power to said first function portion by said power supplying means;
    wherein said stopping means stops said first function portion by controlling said supply controlling means to stop the supply of power to said first function portion.

3. The information processor according to claim 1, wherein when said determining means determines that said communication means is downloading the content data, said stopping means stops said first function portion after the download is completed.

4. The information processor according to claim 1, further comprising presenting means for, when said instructing means issues the instruction to stop said first function portion, presenting based on the determined results obtained from said determining means whether or not said communication means is executing the communication processing.

5. An information processing method for use in an information processor including a first function portion having a communication step of executing processing relating to communication of data, and a communication managing step of controlling said communication step and of managing information representing whether or not the processing relating to the communication of the data is being executed in said communication step, and a second function portion having a function different from that of said first function portion, said method comprising the steps of:
    receiving an instruction to stop said first function portion;
    determining based on the information managed in the processing of said communication managing step whether or not the communication processing is being executed in the processing of said communication step, when the instruction to stop said first function portion is received in the processing of an instruction receiving step, a determining step being executed in said second function portion, as one function of a plurality of function portions, different from said first function portion; and
    stopping said first function portion after the communication processing is completed, when it is determined in the processing of said determining step that the communication processing is being executed in the processing of said communication step;
    wherein said second function portion executes processing relating to reproduction of content data
    wherein said first function portion communicates with an other information processor to download content data, and records the content data in a recording medium installed in said second function portion, and said second function portion executes processing relating to reproduction of the content data recorded in said recording medium.

6. A computer readable program for making an information processor execute information processing, said information processor including a first function portion having a communication step of executing processing relating to communication of data, and a communication management step of controlling said communication step and of managing information representing whether or not the processing relating to the communication of the data is being executed in said communication step, and a second function portion having a function different from that of said first function portion, said program comprising instructions for executing the steps of:
    receiving an instruction to stop said first function portion;
    determining based on the information managed in the processing of said communication management step whether or not the communication processing is being executed in the processing of said communication step, when the instruction to stop said first function portion is received in the processing of an instruction reception step, said determining step being executed in said second function portion, as one function of a plurality of function portions, different from said first function portion; and stopping said first function portion based on the determined results obtained from the processing of said determining step executed in said second function portion;

wherein said second function portion executes processing relating to reproduction of content data wherein said first function portion communicates with an other information processor to download content data, and records the content data in a recording medium installed in said second function portion, and said second function portion executes processing relating to reproduction of the content data recorded in said recording medium.

7. A recording medium having a computer readable program recorded, said program serving to make an information processor execute information processing, said information processor including a first function portion having a communication step of executing processing relating to communication of data, and a communication management step of controlling said communication step and of managing information representing whether or not the processing relating to the communication of the data is being executed in said communication step, and a second function portion having a function different from that of said first function portion, said program comprising instructions for executing the steps of:

receiving an instruction to stop said first function portion;

determining based on the information managed in the processing of said communication management step whether or not the communication processing is being executed in the processing of said communication step, when the instruction to stop said first function portion is received in the processing of an instruction reception step, said determining step being executed in said second function portion, as one function of a plurality of function portions, different from said first function portion; and stopping said first function portion based on the determined results obtained from the processing of said determining step executed in said second function portion;

wherein said second function portion executes processing relating to reproduction of content data wherein said first function portion communicates with an other information processor to download content data, and records the content data in a recording medium installed in said second function portion, and said second function portion executes processing relating to reproduction of the content data recorded in said recording medium.

8. An information processor comprising:

a communication function portion for executing processing relating to communication of data;

a reproduction function portion for executing processing relating to reproduction of data of content containing data of content downloaded through communication with an other information processor made by said communication function portion;

first instructing means for issuing an instruction to activate or stop a predetermined function;

second instructing means for issuing an instruction to activate said communication function portion; and power supplying means for, when said first instructing means issues the instruction to execute the predetermined function, supplying power to said reproduction function portion, for, when said second instructing means issues the instruction to activate said communication function portion, supplying power to said communication function portion, and for, when said first instructing means issues the instruction to stop said predetermined function, stopping a supply of power to said reproduction function portion and said communication function portion;

wherein the communication function portion records the content data in a recording medium installed in the reproduction function portion, and the reproduction function portion executes processing relating to reproduction of the content data recorded in the recording medium.

* * * * *